R. D. BROWN.
Harvester Rake.
No. 51,550.
Patented Dec. 19, 1865.
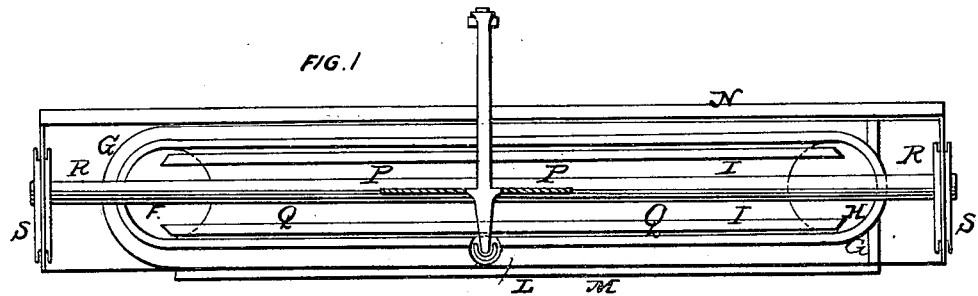
FIG. 1
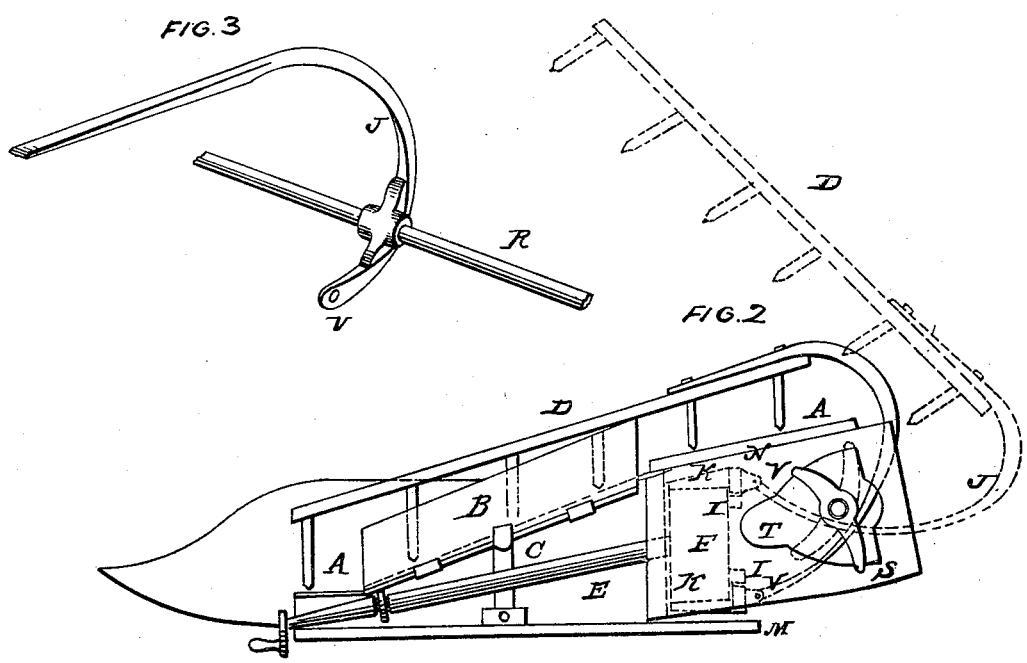
FIG. 3
FIG. 2
WITNESSES
L. Fuchs
S. S. Fahnestock
INVENTOR
Robert D Brown
By his Atty
J. Franklin Reigart

United States Patent Office.

ROBERT D. BROWN, OF COVINGTON, INDIANA.

IMPROVEMENT IN RAKE ATTACHMENTS TO HARVESTERS.

Specification forming part of Letters Patent No. 51,550, dated December 19, 1865.

*To all whom it may concern:*

Be it known that I, ROBERT D. BROWN, of Covington, Fountain county, and State of Indiana, have invented an Improved Continuous Rake for Harvesters; and I do hereby declare the following to be an exact description thereof, reference being had to the accompanying drawings, and to the letters of reference marked thereon, making a part of this specification.

My invention relates to a self-adjusting and continuous rake moving with an endless chain and on a guide-rod, with check-levers, all arranged and combined with the platform.

Figure 1 represents the rear end of the platform, in which is seen the endless chain, the rake with its flange in the groove of the guide-rod, and the check-levers S on each side. Fig. 2 is a side elevation, showing the rake on the platform, and also its erect position while passing from left to right, the side-board, driving-shaft, and the shape of the check-levers and their slots. Fig. 3 shows the rear end of the rake, that may be made to move on the guide-rod instead of with a flange operating in the groove of the guide-rod, as deemed best.

A is the platform that is usually attached to harvesting-machines.

B is a spring side-board, self-adjusting by the spring C operating on the outside, so that the grain is pushed by the rake D along the platform until it is pressed in a bunch or heap against the side-board, when the whole bundle is precipitated at once to the ground instead of in scattering parcels of grain, which would be thrown off irregularly and spread too thinly on the ground, the side-board yielding to the pressure of the bundle.

E is the shaft that revolves the toothed wheel F, which drives the endless chain G, and H the independent pulley that supports the endless chain at the opposite side.

The endless chain travels along an extension-frame, I, made either of wood or hoop-iron, so that the chain is kept regular and smooth in its revolution.

The rake D travels along the top of the platform A with the points of its teeth on the top of the platform. Its rear end, J, is curved, and the end K is attached permanently to the endless chain, and has a friction-roller, L, that travels with the endless chain at its outside edge and revolves against the extension-frame I and the frame M below as a guide, and between the extension-frame I and the top frame, N, as its guide above.

On the curved part of the lever J is a flange, P, working back and forth in the groove Q of a guide-rod, R, that is partly revolved by the movement of the rake and kept in check by eccentric-shaped levers S, that prevent the rod R from moving farther back than required, and move back and forth in their eccentric-shaped slots T the distance required, that corresponds with the vertical movement of the rake D.

The rake having a horizontal continuous motion with the endless chain and an upright or vertical motion, the rake passes over and on the top of the platform as its end K moves on the under side of the endless chain to the farthest end of the platform, when the end K rises to the upper side of the endless chain, and the rake D then rises to the height required (nearly perpendicular) and moves in that erect or vertical position to the opposite end of the platform, when the rake descends with the endless chain around the independent pulley again to the platform, after having been guided and supported in its position by the guide-rod R.

The rake has also a hinge-joint, V, near the friction-roller L, for the purpose of giving an easy motion to the rake and preventing its jarring or straining its connection with the endless chain or producing any disturbance in its regular motion from the horizontal to the erect position.

What I claim as my invention, and desire to secure by Letters Patent, is—

Giving the rake a continuous horizontal and self-adjusting erect motion by the endless chain G, guide-rod R, and check-levers S, when arranged and combined with the platform as herein described, for the purposes set forth.

ROBERT D. BROWN.

Witnesses:
JOHN S. HOLLINGSHEAD,
J. FRANKLIN REIGART.